United States Patent
Liu et al.

(10) Patent No.: US 9,423,318 B2
(45) Date of Patent: Aug. 23, 2016

(54) MOTION DETECTION DEVICES AND SYSTEMS

(71) Applicant: Honeywell International Inc., Morristown, NJ (US)

(72) Inventors: Haiyang Liu, Plymouth, MN (US); Jeffrey Baker, Gastonia, NC (US); Charles Joseph Cunningham, IV, Broomall, PA (US); William Stephen Caldwell, Suwanee, GA (US)

(73) Assignee: Honeywell International Inc., Morristown, NJ (US)

( * ) Notice: Subject to any disclaimer, the term of this patent is extended or adjusted under 35 U.S.C. 154(b) by 24 days.

(21) Appl. No.: 14/445,871

(22) Filed: Jul. 29, 2014

(65) Prior Publication Data

US 2016/0033366 A1    Feb. 4, 2016

(51) Int. Cl.
  *G01M 17/00*  (2006.01)
  *G01M 17/007*  (2006.01)
  *G01P 3/50*  (2006.01)

(52) U.S. Cl.
  CPC .............. *G01M 17/007* (2013.01); *G01P 3/50* (2013.01)

(58) Field of Classification Search
  CPC ........ G01C 23/00; G01C 19/32; G01C 21/16; G01C 23/005; G01M 17/007; G01P 3/50
  See application file for complete search history.

(56) References Cited

U.S. PATENT DOCUMENTS

| | | | | |
|---|---|---|---|---|
| 7,647,175 B2* | 1/2010 | Fateh | ..................... | G01C 21/16 345/158 |
| 8,370,064 B1* | 2/2013 | Li | ....................... | G01C 21/165 701/479 |
| 8,872,889 B2* | 10/2014 | Soucy | ................ | G01C 15/002 348/42 |
| 9,013,617 B2* | 4/2015 | Ramachandran | ...... | G01C 25/00 348/208.1 |
| 2002/0147527 A1* | 10/2002 | McCall | ................. | B25J 9/1651 700/245 |
| 2003/0149528 A1* | 8/2003 | Lin | ...................... | G01C 21/165 701/472 |
| 2006/0287824 A1* | 12/2006 | Lin | ...................... | G01C 21/165 701/472 |
| 2007/0067112 A1* | 3/2007 | Fiedler | ................ | B60G 17/016 702/33 |
| 2009/0265104 A1* | 10/2009 | Shroff | ..................... | G01S 19/47 701/472 |
| 2009/0293012 A1 | 11/2009 | Alter et al. | | |
| 2010/0070193 A1* | 3/2010 | Solinsky | ............ | G01C 21/005 702/19 |

(Continued)

FOREIGN PATENT DOCUMENTS

| | | |
|---|---|---|
| JP | 2010054374 A | 3/2010 |
| WO | 2009136969 A2 | 11/2009 |
| WO | 2012101529 A2 | 8/2012 |

OTHER PUBLICATIONS

Combined Search and Examination Report from related GB Patent Application No. GB1512860.6, dated Jan. 8, 2016, 10 pp.

*Primary Examiner* — Calvin Cheung
(74) *Attorney, Agent, or Firm* — Additon, Higgins & Pendleton, P.A.

(57) ABSTRACT

Motion detection devices and systems are described herein. One motion detection device includes an inertial measurement unit (IMU) configured to measure velocity, orientation, and gravitational forces of the motion detection device and a computing component. The computing component can be configured to determine spectrum parameters of a mobile vehicle associated with the motion detection device using measurements from the IMU, determine IMU orientation parameters using measurements from the IMU, and estimate motion of the mobile vehicle using the spectrum parameters, the IMU orientation parameters, measurements from the IMU, and a motion estimation function.

14 Claims, 6 Drawing Sheets

(56) References Cited

U.S. PATENT DOCUMENTS

| | | | | |
|---|---|---|---|---|
| 2011/0125404 A1* | 5/2011 | Czompo | ................ | G01S 19/49 701/472 |
| 2011/0291648 A1 | 12/2011 | Vissiere | | |
| 2012/0221216 A1* | 8/2012 | Chauncey | ........... | B60R 16/0236 701/51 |
| 2013/0307842 A1* | 11/2013 | Grinberg | ............... | G06F 3/1431 345/419 |
| 2014/0253443 A1* | 9/2014 | Elson | .................... | G06F 3/0346 345/158 |
| 2014/0278218 A1* | 9/2014 | Chang | ..................... | G01P 15/00 702/150 |
| 2015/0153170 A1* | 6/2015 | Gonzalez | ............... | G01B 21/22 701/300 |
| 2015/0201867 A1* | 7/2015 | Peindl | .................. | A61B 5/1118 600/595 |
| 2015/0207988 A1* | 7/2015 | Tracey | ............... | H04N 5/23238 348/36 |

* cited by examiner

MOTION DETECTION DEVICES AND SYSTEMS

TECHNICAL FIELD

The present disclosure relates to motion detection devices and systems.

BACKGROUND

Mobile vehicles, such as a forklift or car, can be equipped with computers that include a screen. The screen can display information for vehicle status, productivity, and/or safety monitoring. When the mobile vehicle is moving, the screen may not display any information (e.g., go blank) to avoid distracting the driver's attention when driving. When the mobile vehicle is stationary, the screen may display information as soon as possible to minimize productivity disruption.

It is therefore essential to detect a mobile vehicle's motion status in real time. Traditionally, the motion can be detected by attaching sensors and cables to the mobile vehicle on the gas and brake pedals. However, in some instances, the attachment can be time consuming and may void the warranty of the mobile vehicle. Further, if a mobile vehicle is leased, the attachment of sensors and cables may not be allowed by the lessor.

DETAILED DESCRIPTION

Motion detection devices and systems are described herein. For example, one or more motion detection devices can include an inertial measurement unit (IMU) configured to measure velocity, orientation, and gravitational forces of the motion detection device and a computing component. The computing component can be configured to determine spectrum parameters of a mobile vehicle associated with the motion detection device using measurements from the IMU, determine IMU orientation parameters using measurements from the IMU, and estimate motion of the mobile vehicle using the spectrum parameters, the IMU orientation parameters, measurements from the IMU, and a motion estimation function.

Mobile vehicles, such as a forklift or car, can be equipped with computers that include a screen. For instance, a computer on a forklift can be used to display information on where a driver should drive to next (e.g., the next job and/or project), safety reminders and/or monitoring, and/or can record productivity of the driver. To avoid distracting the driver's attention when driving, it can be advantageous to not display any information on the screen (e.g., go blank) to avoid distracting the driver's attention. When the mobile vehicle is stationary, the screen may display information as soon as possible to minimize productivity disruption. Thereby, the screen may be deactivated (e.g., go blank) when the vehicle is in motion and activated (e.g., display information) when the vehicle is not in motion.

In order to properly activate and/or deactivate the screen, the mobile vehicle's motion status in real time can be detected. Traditionally, the motion can be detected by attaching sensors and cables to the mobile vehicle on the gas and brake pedals. However, in some instances, the attachment can be time consuming and may void the warranty of the mobile vehicle. Further, if a mobile vehicle is leased, the attachment of sensors and cables may not be allowed by the lessor. For instance, forklifts are often leased, making it difficult to install such sensors and cables.

By contrast, embodiments of the present disclosure include motion detection devices and systems that can be externally attached to the mobile vehicle and can estimate motion based on vibrations of the mobile vehicle. A motion detection device, in accordance with one or more embodiments, can include an IMU that can measure velocity, orientation, and gravitational forces of the motion detection device using a combination of accelerometers, gyroscopes, and/or magnetometers.

Using the measurements, the motion detection device can estimate motion of a mobile vehicle that the motion detection device is attached to. The estimation can include detection of motion and/or non-motion (e.g., stationary) of the mobile vehicle based on a frequency of vibrations measured. Using a motion detection device that can be externally attached to a mobile vehicle can be easier to install, cheaper, and/or may not void warranties as compared to past solutions, such as sensors and cables.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" refers to one or more. For example, "a number of parameters" can refer to one or more parameters.

Figure 1A:
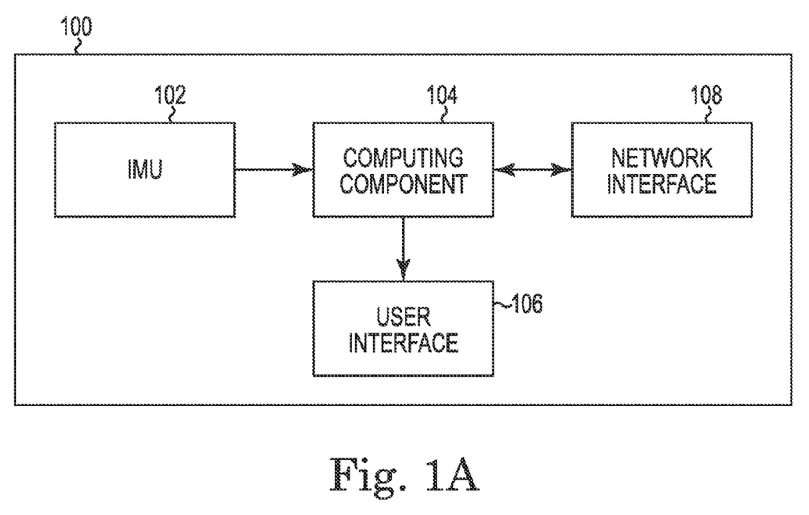
FIGS. 1A-1B illustrates an example of a motion detection device in accordance with one or more embodiments of the present disclosure.
Figure 1B:
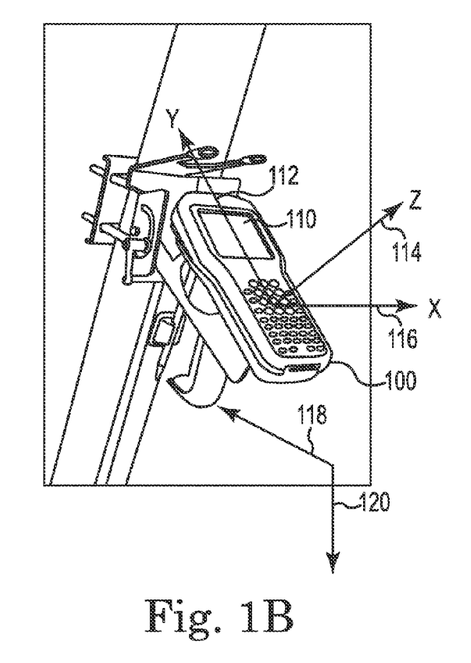

FIGS. 1A-1B illustrates an example of a motion detection device 100 in accordance with one or more embodiments of the present disclosure. The motion detection device 100 can be attached (e.g., mounted) to a mobile vehicle and used to detect motion of the mobile vehicle based on frequency of vibration measurements.

A mobile vehicle, as used herein, can include a machine that can move and/or transport passengers or cargo using an energy source. Example mobile vehicles can include a gas-powered car, an electric car, a forklift, a golf-cart, a motor-cycle, among other gas and/or electric powered vehicles.

As illustrated by FIG. 1A, a motion detection device 100 can include an inertial measurement unit (IMU) 102, a computing component 104, a user interface 106, and a network interface 108. The network interface 108 can allow for processing on another networked computing device or such devices can be used to obtain executable instructions for use with various embodiments provided herein.

A user-interface 106 can include hardware components and/or computer-readable instruction components for a user to interact with a computing component of the motion detection device using audio commands, text commands, and/or images. A user, as used herein, can include a driver and/or other person associated with the mobile vehicle. For instance, the user-interface 106 can receive user inputs (e.g., as discussed further herein).

An IMU 102, as used herein, can include a component that can measure and/or track movement measurements (e.g., movement of the motion detection device). As an example, the IMU component can measure velocity, orientation, and/or gravitation forces of the location device using a combination of accelerometers, gyroscopes, and/or pressure sensors. For instance, the IMU component can measure and/or monitor acceleration, rotation (e.g., pitch, roll, and yaw), and/or vibration of the motion detection device 100.

Although not shown in FIG. 1A for clarity and so not to obscure embodiments of the present disclosure, the computing component 104 can include a memory and a processor coupled to the memory. The memory can be any type of storage medium that can be accessed by the processor to perform various examples of the present disclosure. For example, the memory can be a non-transitory computer readable medium having computer readable instructions (e.g., computer program instructions) stored thereon that are executable by the processor to perform various examples of the present disclosure.

The memory can be volatile or nonvolatile memory. The memory can also be removable (e.g., portable) memory, or non-removable (e.g., internal) memory. For example, the memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory. Further, the memory can be located in the computer-generated speech device, or internal to another computing component (e.g., enabling computer readable instructions to be downloaded over the Internet or another wired or wireless connection).

In various embodiments of the present disclosure, the motion detection device 100 can include one or more input devices. A user may enter commands and information into the motion detection device 100 through the input devices. Example input devices can include a keyboard, mouse and/or other point device, touch screen, microphone, joystick, game pad, scanner, wireless communication, etc. The input devices can be connected to the motion detection device 100 through an interface, such as a parallel port, game port, or a universal serial bus (USB). A screen or other type of display device can also be connected to the system via a user interface 106, such as a video adapter. The screen can display graphical user information for the user.

The computing component 104, in various embodiments, can be used to perform a number of processes including an offline calibration, an online calibration, and/or an online motion estimation process, as discussed further herein with regards to FIGS. 2-5. The computing component 104, using measurements from the IMU 102 can, for instance, estimate motion of a mobile vehicle that the motion detection device 100 is attached to (e.g., mounted to).

The user interface 106 can be configured to provide a display on a screen. For instance, the user interface 106 can be configured to provide a blank display on the screen in response to a determination that the mobile vehicle is in motion and/or provide a display on the screen in response to a determination that the mobile vehicle is not in motion (e.g., idle). A screen, as used herein, can be a device that displays information. Example screens can include a liquid crystal display (LCD), a cathode ray tube (CRT), a touch screen, a plasma, and/or an organic light-emitting diode (OLED), among other screens.

FIG. 1B illustrates a motion detection device 100 mounted on a mobile vehicle. The motion detection device 100 illustrated in FIG. 1B can include the same motion detection device 100 illustrated in FIG. 1A, for example.

The motion detection device 100 can be used to estimate motion of the mobile vehicle using IMU orientation parameters 112, 114, 116 and a gravity vector 120. The IMU orientation parameters 112, 114, 116, as further discussed herein, can include IMU accelerometers readings along X 116, Y 112, and Z 114 axes (e.g., directions). A gravity vector, as used herein, can include a direction and magnitude of gravitational forces. The gravity vector 120 can be determined from a measurement of the IMU (e.g., IMU accelerometers readings along X 116, Y 112, and Z 114 axes) and can be used to determine a vertical tilting angle of the motion detection device 100, as discussed further herein.

The IMU orientation parameters 112, 114, 116, and the gravity vector 120 (and/or a maximized peak value of acceleration) can be used to determine a forward vector 118 of the mobile vehicle. The IMU orientation parameters 112, 114, 116, gravity vector 120, and forward vector 118 can be determined in an online calibration process, as further discussed in connection with FIGS. 2 and 4. A forward vector, as used herein, can be a horizontal straightforward moving direction and/or magnitude (e.g., acceleration).

Determining a parameter and/or other features (such as IMU parameters, gravity vector, etc.), as used herein, intends to be calculating and/or otherwise identifying a numerical value of the parameter and/or other feature. Estimating a parameters and/or other features (such as the forward vector, motion, speed, etc.), as used herein, intends to be calculating and/or otherwise identifying a numerical value of the parameter and/or other feature that is an estimate (e.g., gives a general idea about the value, size, and/or cost).

Figure 2:
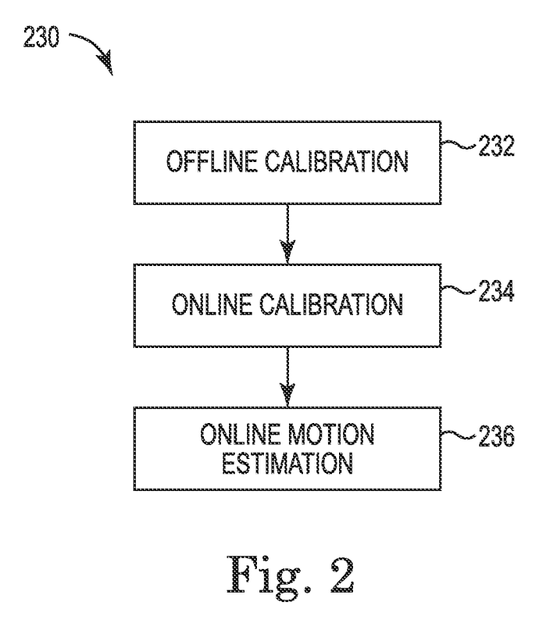
FIG. 2 illustrates a flow diagram of an example of a process for estimating motion using a motion detection device in accordance with one or more embodiments of the present disclosure.

FIG. 2 illustrates a flow diagram of an example of a process 230 for estimating motion using a motion detection device in accordance with one or more embodiments of the present disclosure. The motion detection device 100 illustrated in FIGS. 1A and 1B can be used to perform the process 230, for example. For example, the computing component 104 illustrated in FIG. 1 can be used to perform the process 230.

At block 232, the mobile detection device can perform offline calibration. The offline calibration can include determining offline calibration parameters of a mobile vehicle associated with motion detection device. Offline calibration, as used herein, can be a process performed using the motion detection device attached (e.g., mounted) to a mobile vehicle that is not dependent on a particular driver (e.g., the driver is not a factor). By contrast, an online calibration, as discussed further herein, can be a process performed using the motion detection device attached to the mobile vehicle that is performed for each particular driver (e.g., is dependent on the particular driver).

For instance, a number of offline calibration parameters can be determined using measurements from the IMU when the mobile vehicle is idle and/or in motion. Example offline calibration parameters can include spectrum parameters, time domain filter parameters, system performance characteristics, and/or window parameters, among other parameters.

The mobile vehicle associated with the motion detection device, as used herein, can be a mobile vehicle that the motion detection device is attached to (e.g., mounted on). The motion detection device can be attached to the mobile vehicle such that the Y-axis of the accelerometer of the IMU is aligned with a forward direction of the mobile vehicle.

Spectrum parameters, as used herein, can be parameters associated with a spectrum of frequency of vibrations of a mobile vehicle when the mobile vehicle is idle and/or in motion. An idle mobile vehicle can be a stationary vehicle with an engine and/or other source of power running. A mobile vehicle in motion can be a moving mobile vehicle.

The spectrum parameters can include a cutoff frequency range of the idle mobile vehicle, among other parameters. A cutoff frequency range of the idle mobile vehicle can include a vibration frequency value of an idle mobile vehicle (e.g., a frequency associated with the vibration of an idle mobile vehicle). For example, the cutoff frequency range of the idle mobile vehicle can include a minimum frequency value that corresponds to an idle mobile vehicle. A frequency value below the cutoff frequency range of the idle mobile vehicle can include a frequency of a mobile vehicle in motion.

In various instances, the offline calibration parameters can include a number of other parameters. For example, offline calibration parameters can include exponentially weighted moving average (EWMA) parameters of a mobile vehicle and/or window parameters, as discussed further in connection with FIG. 3A.

Upon a change of IMU orientation (e.g., with a new driver), at block 234, the mobile detection device can perform online calibration. The online calibration can be performed each time an IMU orientation is changed (e.g., the positioning of the mobile detection device is changes), such as a change in driver. The online calibration can include determining IMU orientation parameters using measurements from the IMU measured when the mobile vehicle is idle and/or in motion. The online calibration can be used to determine the IMU orientation so that the mobile vehicle vibration along a forward vector (e.g., the forward direction of the mobile vehicle) can be determined.

IMU orientation parameters can include IMU accelerometer readings on X, Y, and Z axes (e.g., directions). The IMU orientation parameters can be determined using the gravity vector. In some embodiments, the IMU orientation parameters can be determined using an acceleration peak maximum, as discussed further in connection with FIG. 4, in addition to the gravity vector.

At block 236, the mobile detection device can perform online motion estimation. Online motion estimation can include a real-time motion detection of the mobile vehicle using measurements from the IMU of the motion detection device. Estimating motion, as used herein, can include detecting whether the mobile vehicle is in motion using a motion estimation threshold. A motion estimation threshold, as used herein, is a cut-off frequency value used to classify whether a mobile vehicle is in motion or not (e.g., a frequency band selected in the offline calibration process). For example, the online motion estimation can include estimating motion of the mobile vehicle using the spectrum parameters, the IMU orientation parameters, measurements from the IMU, and a motion estimation function. The measurements from the IMU can include real-time measurements.

The motion estimation function, as used herein, can include a sliding window motion estimation function such as a sliding window Discrete Fourier Transformation function (DFT). A sliding window function, as used herein, can include a function that can be used to process data from a fixed length of time (e.g., a window). DFT, as used herein, can include a function that converts a finite list of equally spaced samples of the function into a list of coefficients of a finite combination of complex sinusoids, ordered by their frequencies, that has the sample values. A sliding window DFT, as used herein, can include a DFT applied at each window of data.

Figure 3A:
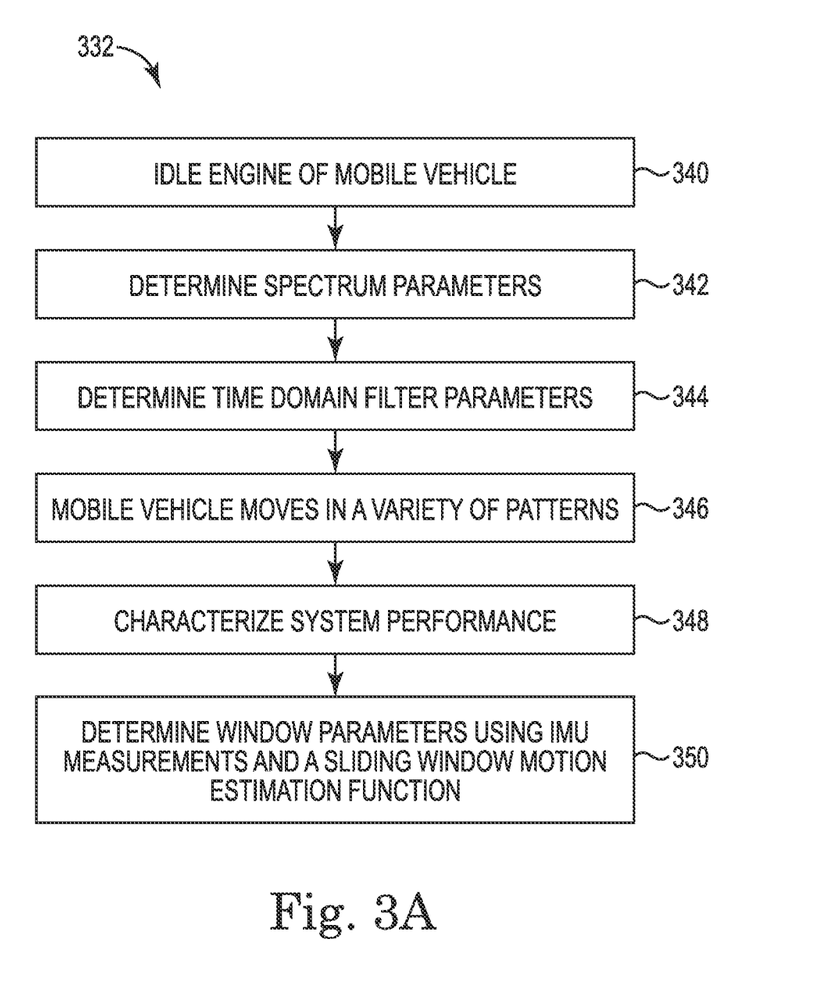
FIG. 3A illustrates a flow diagram of an example of a process for performing offline calibration using a motion detection device in accordance with one or more embodiments of the present disclosure.

FIG. 3A illustrates a flow diagram of an example of a process 332 for performing offline calibration using a motion detection device in accordance with one or more embodiments of the present disclosure. The offline calibration can be performed once for a mobile vehicle and/or periodically (e.g., recalibration each week, each month, etc.).

The motion detection device 100 illustrated in FIGS. 1A and 1B can be used to perform the process 332, for example. For example, the computing component 104 illustrated in FIG. 1 can be used to perform the process 332.

At block 340, the mobile vehicle can be idle. An idle mobile vehicle can be a mobile vehicle (e.g., an engine of the mobile vehicle) that is powered and is not in motion. An idle mobile vehicle can, in various instances, create vibration of a particular frequency and/or frequency range. For example, the frequency and/or frequency range of an idle mobile vehicle can be a higher frequency than the frequency and/or frequency range of a moving mobile vehicle.

At block 342, spectrum parameters can be determined using measurements from the IMU measured when the mobile vehicle is idle and/or in motion. For instance, the frequency of the vibrations associated with an idle mobile vehicle can be compared to a frequency of vibrations associated with the mobile vehicle moving in a forward motion. The spectrum parameters can include a cutoff frequency range of the idle mobile vehicle (e.g., a minimum frequency peak of vibrations when the vehicle is idle) and/or a maximum frequency of the mobile vehicle when along a forward direction (e.g., a maximum frequency peak of vibrations when the mobile vehicle is moving).

At block 344, time domain filter parameters of a mobile vehicle associated with the motion detection device can be determined using measurements from the IMU. Example time domain filter parameters can include exponentially weighted moving average (EWMA) parameters, a parameter for speed estimation, and/or a zero resetting parameter.

EWMA, as used herein, can include an infinite impulse response filter that applies weighting factors which increase exponentially to calculate a moving average of data points of a dataset by creating a series of averages of different subsets of a full dataset. EWMA parameters can refer to alpha the weighing factor for historical readings. A parameter for speed estimation can be an estimated amplitude of velocity (e.g., a scalar number). A zero resetting parameter can include any systematic sensor reading drifting offsets for zero resetting in the online motion detection process.

In various embodiments, as illustrated by FIG. 3A, the offline calibration can include, at block 346, moving the mobile vehicle in a variety of patterns. The movement in a variety of patterns can include motion pattern benchmarking. Example movements can include forward, turning, backing up, lifting, etc.

At block 348, system performance can be characterized based on the motion patterns. System performance characteristics can include parameters such as response delays (e.g., delays in measurements from the IMU), false positive rates (e.g., estimation of motion when idle), and/or false negative rates (e.g., estimation of idle when in motion), among other parameters.

At block 350, the process can include determining window parameters using measurements from the IMU measured when mobile vehicle is moving and a sliding window motion estimation function. The window parameters, as used herein, can include window size, shift size, and/or motion estimation threshold, among other parameters for the sliding window motion estimation function.

The window parameters can be determined, for instance, by applying the sliding window motion estimation function to the measurements from the IMU when the mobile vehicle is moving under the variety of patterns (e.g., at block 346). For instance, the sliding window motion estimation function can be applied to the IMU measurements at each sliding window.

Figure 3B:
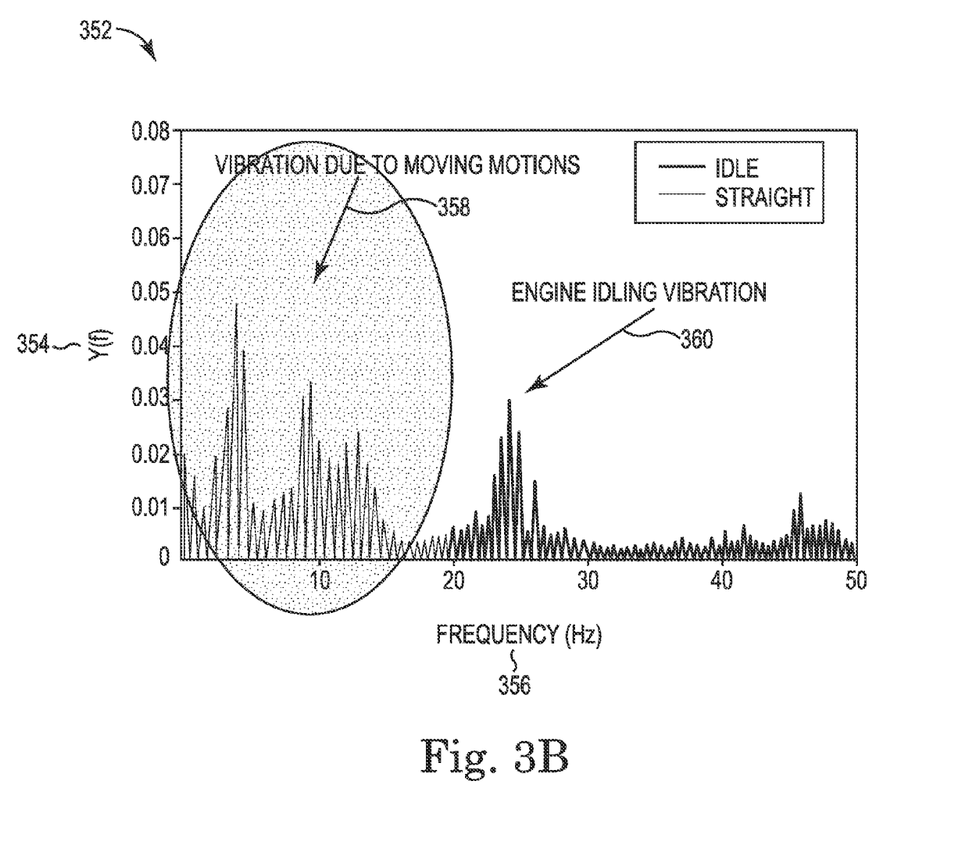
FIG. 3B illustrates a diagram of an example frequency graph in accordance with one or more embodiments of the present disclosure.

FIG. 3B illustrates a diagram of an example frequency graph 352 in accordance with one or more embodiments of the present disclosure. The frequency graph 354 can include a signal spectrum of frequency of vibration measured using a motion detection device associated with a mobile vehicle. For example, the frequency graph 352 illustrates frequency 356 of vibrations 354 of a mobile vehicle in motion 358 and/or a mobile vehicle that is not in motion (e.g., engine is idle) 360.

The frequency graph 354 can illustrate spectrum parameters. The spectrum parameters illustrated by the frequency graph 354 can include a cutoff frequency range of the idle mobile vehicle and/or a maximum frequency of the mobile vehicle when moving along a forward direction. For example, a frequency value of 18 HZ can include the cutoff frequency range of the idle mobile vehicle. That is, a measured frequency of vibration that is less than 18 HZ can be associated with a moving mobile vehicle and a measured frequency of vibration that is greater than 18 HZ can be associated with an idle mobile vehicle. A maximum frequency of the mobile vehicle when moving along a forward direction can include 23 HZ.

Figure 4:
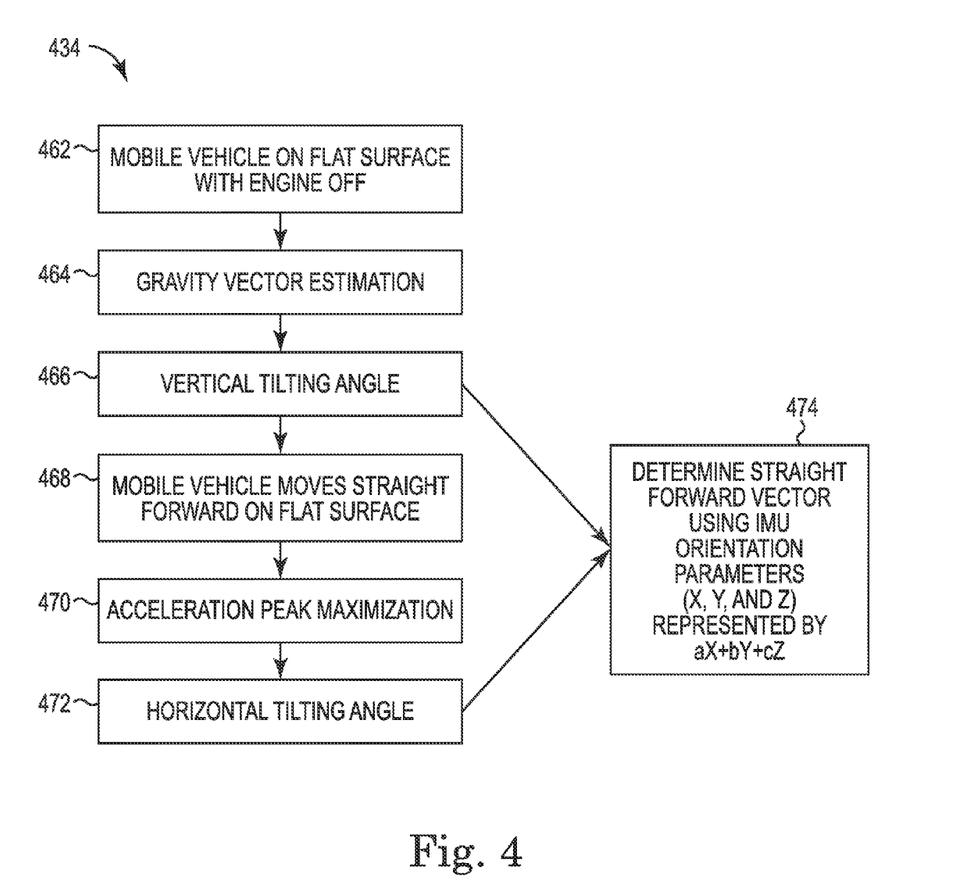
FIG. 4 illustrates a flow diagram of an example of a process for performing online calibration using a motion detection device in accordance with one or more embodiments of the present disclosure.

FIG. 4 illustrates a flow diagram of an example of a process 434 for performing online calibration using a motion detection device in accordance with one or more embodiments of the present disclosure. The online calibration can be performed each time the motion detection device orientation is changed.

The motion detection device 100 illustrated in FIGS. 1A and 1B can be used to perform the process 434, for example. For example, the computing component 104 illustrated in FIG. 1 can be used to perform the process 434.

For instance, the online calibration can be used to determine IMU orientation so that the mobile vehicle vibration measured along a forward vector can be estimated (e.g., during the online motion estimation as discussed in connection with FIG. 5). A forward vector can include a horizontal straightforward moving direction and/or magnitude (e.g., acceleration). The forward vector can be estimated using the IMU orientation parameters. The IMU orientation parameters can be determined using measurements from the IMU measured when the mobile vehicle is moving, idle, and/or off, as discussed herein.

In various embodiments, determining IMU orientation parameters can include determining a gravity vector and, in some instances, an acceleration peak maximum. A gravity vector, as used herein, can include a direction of gravitational forces. The gravity vector can be used to determine a vertical tilting angle of the motion detection device.

The acceleration peak maximum can include a maximum frequency value of acceleration of the mobile vehicle. The acceleration peak maximum can be used to determine a horizontal tilting angle.

For example, at block 462, the process 434 can include locating the mobile vehicle on a flat surface with the engine off. Measurements from the IMU while the engine is off, at block 464, can be used to determine the gravity vector. The gravity vector can be determined, for instance, directly from accelerometer readings of the IMU along X, Y, and Z axes.

At block 466, the gravity vector can be used to determine a vertical tilting angle of the motion detection device. If the motion detection device is mounted on a U-structure with only one tilting degree of freedom, the gravity vector can be used to estimate the forward vector, as discussed further herein.

Alternatively, if the motion detection device is mounted on a ball head allowing arbitrary orientation, at block 468, the mobile vehicle can move straight forward on a flat surface. For instance, the movement can include the mobile vehicle moving straight forward from a stationary state for a minimum amount of time.

At block 470, acceleration peak maximum can be determined using measurements from the IMU measured when the mobile vehicle is moving (e.g., straight forward at block 468). An acceleration peak maximum, as used herein, can include a maximized acceleration peak of IMU measurements. Maximizing the acceleration peak can include adjusting X, Y, Z values to maximize the highest acceleration peak in the equation of $aX+bY+Cz$, as discussed further herein. Using the acceleration peak maximum, at block 472, the horizontal tilting angle of the motion detection device can be determined.

At block 474, a forward vector can be determined using the IMU orientation parameters. For instance, the forward motion vector can be represented by $aX+bY+Cz$, wherein the IMU orientation parameters are (X, Y, and Z). For example, (X, Y, and Z) can include accelerometer readings from the IMU along X, Y, and Z axes (e.g., the gravity vector and/or acceleration peak maximum). And, (a, b, c) can represent forward direction.

Figure 5:
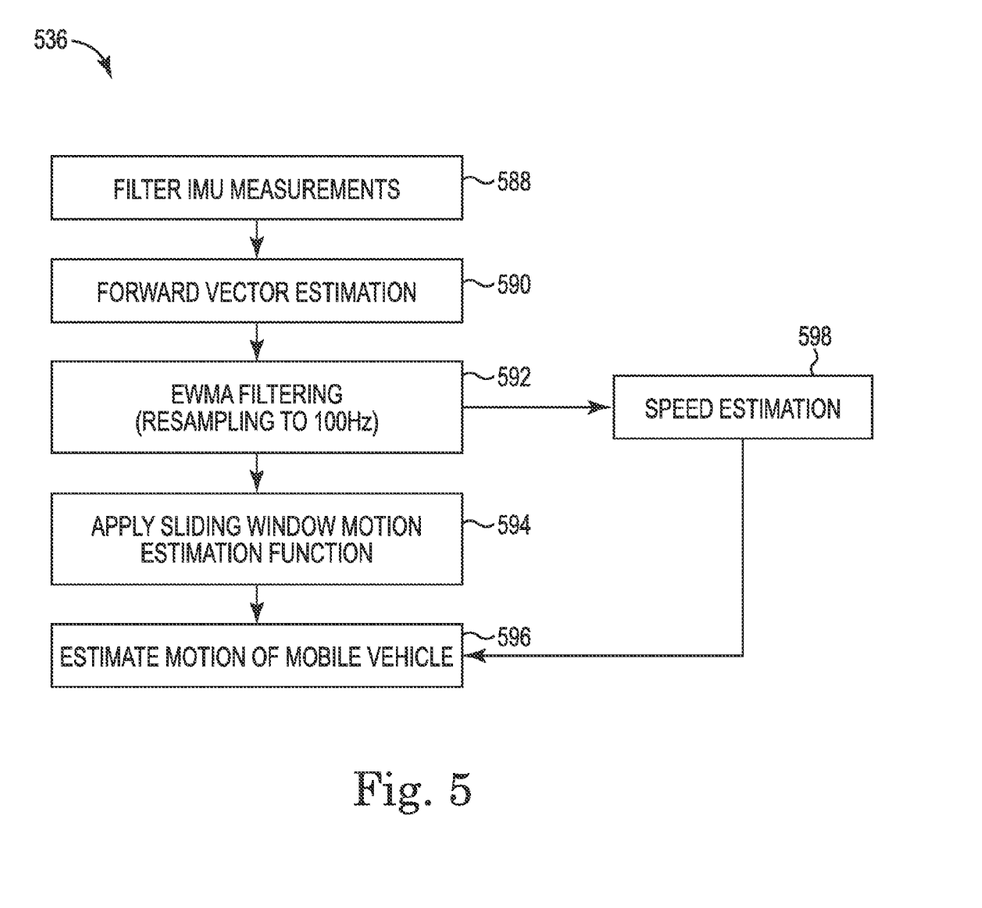
FIG. 5 illustrates a flow diagram of an example of a process for performing online motion estimation using a motion detection device in accordance with one or more embodiments of the present disclosure.

FIG. 5 illustrates a flow diagram of an example of a process 536 for performing online motion estimation using a motion detection device in accordance with one or more embodiments of the present disclosure. The online motion estimation can include estimation of motion of the mobile vehicle using the spectrum parameters, the IMU orientation parameters, measurements from the IMU, and a motion estimation function.

The motion detection device 100 illustrated in FIGS. 1A and 1B can be used to perform the process 536, for example. For example, the computing component 104 illustrated in FIG. 1 can be used to perform the process 536.

At block 588, IMU measurements (e.g., real-time measurements) can be filtered. For example, the IMU measurements can be filtered using at least one time domain filter parameter (e.g., EWMA parameter). The filter can include a gravitational correction and/or an offset correction. The gravitational correction can include using the gravity vector to distill linear accelerations. The offset correction can include using at least one time domain filter parameter (e.g., zero resetting parameter) to remove systematic sensor reading drifts.

At block 590, a forward vector can be estimated using the IMU orientation parameters (e.g., estimated the magnitude of the forward vector using the forward direction determined at block 474 illustrated in connection with FIG. 4). In some embodiments, the data sampled may not be at uniform intervals. In such embodiments, the data used for the forward vector can be resampled at a pre-defined frequency (such as 100 HZ sampling rate).

In various embodiments, an optional time domain analysis can be performed. For instance, if speed is to be estimated, at block 592, the resampled data can be filtered using a EWMA filter. The EWMA filter can use at least one of the time domain filter parameter (e.g., a EWMA parameter) from the offline calibration process illustrated in connection with FIG. 3A by block 344.

Further, at block 598, the speed of the mobile device can be estimated. The speed can be estimated based on one or more past speed estimates and current IMU measurements. For instance, if it is known that the mobile device was moving at 10 miles per hour (mph) 1 second ago and no breaks have been applied, then it can be estimated that the mobile device is still in motion. The speed estimated can be reasonably accurate when the past motion detected was within 20-30 second or less and may become inaccurate over time.

At block 594, a sliding window motion estimation function can be applied to filtered IMU parameters. For instance, the application of the function can be used to extract frequency measurements below a threshold frequency (e.g., low frequency measurements) from the IMU which are most likely induced by movement of the mobile vehicle. The threshold frequency can, for instance, be associated with a spectrum parameter (e.g., the cutoff frequency range of the idle mobile vehicle/the motion estimation threshold).

At block 596, motion of the mobile vehicle can be estimated using the filtered IMU measurements, spectrum parameters, the IMU orientation parameters, window parameters, and the sliding window motion estimation function.

For instance, the application of the function at block 594 can be based on the window parameters determined in the offline calibration process as illustrated in connection with FIG. 3A. Such parameters can include window size and shift size. Alternatively, a user can adjust the window parameters.

Further, the cutoff frequency range determined in the offline calibration process, as illustrated in connection with FIG. 3A, can be applied to the filtered IMU measurements to extract frequency measurements below a threshold frequency (e.g., low frequency measurements which are most likely induced by movement of the mobile vehicle).

Alternatively, a band-pass or band-stop filtering can be used to isolate mobile vehicle vibrations from vibrations induced by actual movement. A band-pass filter can include a filter that passes frequencies within a certain range and rejects frequencies outside the range (e.g., the selected frequency band). A band-stop filter can include a filter that passes most frequencies unaltered but attenuates those in a specific range (e.g., the selected frequency band).

And, the energy of vibrations below the threshold frequency (e.g., low frequency) can be estimated by selecting the maximum amplitude in the selected frequency band and/or integrate amplitude over the selected frequency band. The selected frequency band can include a frequency band selected in the offline calibration process as described in connection with FIG. 3A (e.g., a motion estimation threshold).

The motion estimated can include an estimated speed and/or a determination that the mobile device is in motion. For instance, a user interface of the mobile device can be configured to provide a blank display on a screen in response to a determination that the mobile device is in motion and/or provide a display on the screen in response to a determination that the mobile device is not in motion (e.g., is idle).

That is, embodiments of the present disclosure include motion detection devices and systems that can be externally attached to the mobile vehicle. The motion detection device and/or system can detect motion in real-time based on vibrations of the mobile vehicle using an IMU to estimate motion of mobile vehicle that the motion detection device is attached to. Using an externally attachment motion detection device and/or system that includes an IMU can be easier and/or cheaper to install, and/or may not void warranties as compared to past solutions.

Any of the above information, data, and/or images can be saved along with the plurality of images as metadata and/or a data file which can be available for later image processing and/or other purposes.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:
1. A motion detection device including:
an inertial measurement unit (IMU) configured to measure velocity, orientation, and gravitational forces of the motion detection device; and a computing component configured to:
- determine spectrum parameters of a mobile vehicle associated with the motion detection device using measurements from the IMU, wherein spectrum parameters include a cutoff frequency range of the mobile vehicle when idle and a maximum frequency of the mobile vehicle when moving along a forward direction;
- determine IMU orientation parameters using measurements from the IMU;
- estimate motion of the mobile vehicle using the spectrum parameters, the IMU orientation parameters, measurements from the IMU, and a motion estimation function; and
- deactivate information conveyed to a user in response to the spectrum parameters of the mobile vehicle being below the cutoff frequency range.

2. The device of claim 1, wherein the motion estimation function includes a sliding window Discrete Fourier Transformation function (DFT).

3. The device of claim 1, including a user interface to provide a display on a screen in response to a determination that the mobile vehicle is not in motion.

4. The device of claim 1, wherein the IMU orientation parameters include IMU accelerometer readings along X, Y, and Z axes.

5. The device of claim 1, wherein the computing component configured to estimate motion includes the computing component configured to detect whether the mobile vehicle is in motion using a motion estimation threshold.

6. A motion detection device including:
- an inertial measurement unit (IMU) configured to measure velocity, orientation, and gravitational forces of the motion detection device; and
- a computing component configured to:
  - determine spectrum parameters of a mobile vehicle associated with the motion detection device using measurements from the IMU;
  - determine IMU orientation parameters using measurements from the IMU;
  - estimate motion of the mobile vehicle using the spectrum parameters, the IMU orientation parameters, measurements from the IMU, a motion estimation function, and a motion estimation threshold; and
  - deactivate information conveyed to a user in response to the spectrum parameters of the mobile vehicle being below the cutoff frequency range.

7. The device of claim 6, wherein the computing component configured to determine the IMU orientation parameters includes determining a gravity vector to determine a vertical tilting angle.

8. The device of claim 6, wherein the computing component is configured to filter the IMU measurements, wherein filtering the IMU measurements includes performing:
- gravity correction to distill linear accelerations; and
- offset correction to remove systematic sensor reading drifts using a zero resetting parameter.

9. The device of claim 6, wherein the computing component is configured to perform an exponentially weighted moving average (EWMA) filter process in response to resampling to 100 hertz.

10. The device of claim 6, wherein the computing component is configured to estimate speed of the mobile vehicle based on a past speed estimate and current IMU measurements.

11. A non-transitory computer-readable medium storing instructions executable by a processing resource to:
- an inertial measurement unit (IMU) configured to measure velocity, orientation, and gravitational forces of the motion detection device; and
- a computing component configured to:
  - determine spectrum parameters of a mobile vehicle associated with the motion detection device using measurements from the IMU, wherein spectrum parameters include a cutoff frequency range of the mobile vehicle when idle and a maximum frequency of the mobile vehicle when moving along a forward direction;
  - determine IMU orientation parameters using measurements from the IMU;
  - estimate motion of the mobile vehicle using the spectrum parameters, the IMU orientation parameters, measurements from the IMU, and a motion estimation function; and
  - deactivate information conveyed to a user in response to the spectrum parameters of the mobile vehicle being below the cutoff frequency range.

12. The medium of claim 11, wherein the instructions to estimate motion include instructions executable to estimate energy of vibrations below a threshold frequency.

13. The medium of claim 12, wherein the instructions to estimate an energy of vibrations below a threshold frequency include instructions executable to select a maximum amplitude in a selected frequency band.

14. The medium of claim 12, wherein the instructions to estimate the energy of vibrations below the threshold frequency include instructions executable to integrate amplitude over a selected frequency band.

* * * * *